(12) United States Patent
Tai et al.

(10) Patent No.: US 10,006,512 B2
(45) Date of Patent: Jun. 26, 2018

(54) BRAKE LINING OF DISC BRAKE DEVICE

(71) Applicant: TIEN HSIN INDUSTRIES CO., LTD., Taichung (TW)

(72) Inventors: Herbert Tai, Taichung (TW); Joel Richardson, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 28 days.

(21) Appl. No.: 15/178,090

(22) Filed: Jun. 9, 2016

(65) Prior Publication Data
US 2017/0219032 A1 Aug. 3, 2017

(30) Foreign Application Priority Data
Jan. 29, 2016 (TW) .............................. 105201372 U

(51) Int. Cl.
*F16D 65/04* (2006.01)
*F16D 65/095* (2006.01)
*B62L 1/00* (2006.01)
*F16D 55/225* (2006.01)

(52) U.S. Cl.
CPC ............ *F16D 65/095* (2013.01); *B62L 1/005* (2013.01); *F16D 55/225* (2013.01)

(58) Field of Classification Search
CPC ....... F16D 65/095; F16D 55/225; B62L 1/005
See application file for complete search history.

(56) References Cited

U.S. PATENT DOCUMENTS

| 5,358,078 | A | | 10/1994 | Gajek et al. | |
|---|---|---|---|---|---|
| 5,950,772 | A | * | 9/1999 | Buckley | B62K 23/06 188/18 A |
| 6,318,514 | B1 | * | 11/2001 | Hinkens | B60T 11/22 188/73.32 |
| 6,932,197 | B2 | * | 8/2005 | Lumpkin | B60T 11/046 188/206 R |

* cited by examiner

*Primary Examiner* — Pamela Rodriguez
(74) *Attorney, Agent, or Firm* — Tracy M. Heims; Apex Juris, pllc.

(57) ABSTRACT

A brake lining of a disc brake device is disclosed, wherein the brake lining includes a carrier and a friction block. The carrier has a bearing portion, which has the friction block provided thereon, and a guide portion connected to an end of the bearing portion. A first virtual line passes through a free end of the guide portion and a junction between the guide portion and the bearing portion, and a second virtual line passes through two opposite points of the disc periphery, wherein an included angle formed therebetween is greater than 0. The smallest possible included angle in any embodiments is formed if the first virtual line passes through an end corner of the friction block. With such design, the disc would not be hindered by nor collide with the friction block during installation, which reduces the difficulty and time for installing or fixing the disc brake device.

19 Claims, 11 Drawing Sheets

BRAKE LINING OF DISC BRAKE DEVICE

BACKGROUND OF THE INVENTION

1. Technical Field

The present invention generally relates to disc brake devices, and more particularly to a brake lining of a disc brake device.

2. Description of Related Art

Among the various braking methods applied to bicycles, disc brake devices are becoming widely used in cross-country bicycles or even road bicycles. As shown in FIG. 1, a conventional disc brake device mainly has two linings 110 pressed against a disc 120 to stop a rotating rim, and hence to brake the bicycle.

However, a disc brake device has more parts and components than other kinds of brakes, leading to more complicated and time-consuming installation and maintenance. To improve such problem, the industry has developed a lining, as disclosed in U.S. Pat. No. 5,358,078, of which the ends are slightly bent outward for easier holding, and, therefore, the difficulty and time needed to install or replace parts and components of a disc brake device can be reduced.

In spite of this, the conventional disc brake devices and the one disclosed in the aforementioned U.S. patent both have the following drawback. Take the disc brake device illustrated in FIG. 1 as an example, while assembling the disc 120 into the space between the two linings 110, the disc 120 tends to be hindered by friction blocks 112 of the linings 110, which is inconvenient for installation. In a worst case, the collision which happens between the disc 120 and the friction blocks 112 during installation would damage the disc 120 or the friction blocks 112, and the safety and performance would be negatively affected even after the installation of the disc brake device is completed.

Therefore, the conventional disc brake devices still have room for improvement.

BRIEF SUMMARY OF THE INVENTION

In view of the reasons mentioned above, the primary objective of the present disclosure is to provide a brake lining of a disc brake device. A friction block of the brake lining would not hinder or collide with a disc while being assembled, and the brake lining could further guide the disc to a desired location for installation, which reduces the difficulty and time required for installation or replacement. Also, since the disc would not collide with the friction block, once the installation of the disc brake device is completed, the safety and performance could be ensured.

The present disclosure provides a brake lining of a disc brake device, wherein the disc brake device usually has two said brake linings with a disc disposed therebetween, or has one said brake lining and another conventional lining with the disc disposed therebetween; either two said brake linings or one said brake lining with the another conventional lining are drivable to be pressed against the disc to restrict the disc from rotating. The brake lining includes a carrier and a friction block. The carrier has a bearing portion and a guide portion connected to an end of the bearing portion, wherein a first virtual line passes through a free end of the guide portion and a junction between the guide portion and the bearing portion, and a second virtual line passes through two opposite points of the disc periphery; a first included angle formed between the first virtual line and the second virtual line is greater than 0 degree. The friction block is provided on the bearing portion. A third virtual line passes through an end corner of the friction block and the junction between the guide portion and the bearing portion, and the first included angle is greater than or equal to a second included angle formed between the second virtual line and the third virtual line.

The present disclosure further provides another brake lining of a disc brake device, wherein the disc brake device usually has two said brake linings with a disc disposed therebetween, or has one said brake lining and another conventional lining with the disc disposed therebetween; either two said brake linings or one said brake lining with the another conventional lining are drivable to be pressed against the disc to restrict the disc from rotating. The brake lining includes a carrier and a friction block. The carrier has a bearing portion and a guide portion, wherein the bearing portion has a first segment and a second segment connected to the first segment; an included angle formed between the first segment and the second segment is less than 180 degrees; the guide portion is connected to the second segment; a first virtual line passes through a free end of the guide portion and a junction between the guide portion and the bearing portion, and a second virtual line passes through two opposite points of the disc periphery; a first included angle formed between the first virtual line and the second virtual line is greater than 0 degree. The friction block is provided on the first segment of the bearing portion.

In an embodiment, the included angle between the first segment and the second segment is less than 170 degrees.

In an embodiment, the first included angle between the first virtual line and the second virtual line is less than 45 degrees.

In an embodiment, the guide portion has a guide surface provided on a side the disc is located, and the guide surface is flat.

In an embodiment, the guide portion has a guide surface provided on a side the disc is located, and the guide surface is curved from the junction between the guide portion and the bearing portion toward the free end of the guide portion.

In an embodiment, the guide portion has a guide surface provided on a side where the disc is located, and the guide surface is curved from the junction between the guide portion and the bearing portion toward the free end of the guide portion; a lateral edge of the guide portion is curved toward an opposite lateral edge thereof to form a double curve.

In an embodiment, a width of the guide portion gradually reduces from the junction between the guide portion and the bearing portion to the free end of the guide portion.

In an embodiment, the carrier includes a first substrate and a second substrate; the first substrate has the guide portion provided thereon; the second substrate is connected to the first substrate to form the bearing portion, and the friction block is provided on the second substrate.

In an embodiment, the friction block has an inclined surface at a top edge thereof near the guide portion.

With the invention above, the disc would not collide with nor be hindered by the friction block while being assembled, and the guide portion could quickly guide the disc into the space between two linings, whereby the difficulty and time required for installation and replacement could be reduced.

Also, with the invention above, the disc and the friction block should be intact after completing the installation of the disc brake device, for there would be no collision happening between the disc and the friction block during installation, whereby to ensure the safety and performance thereof.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
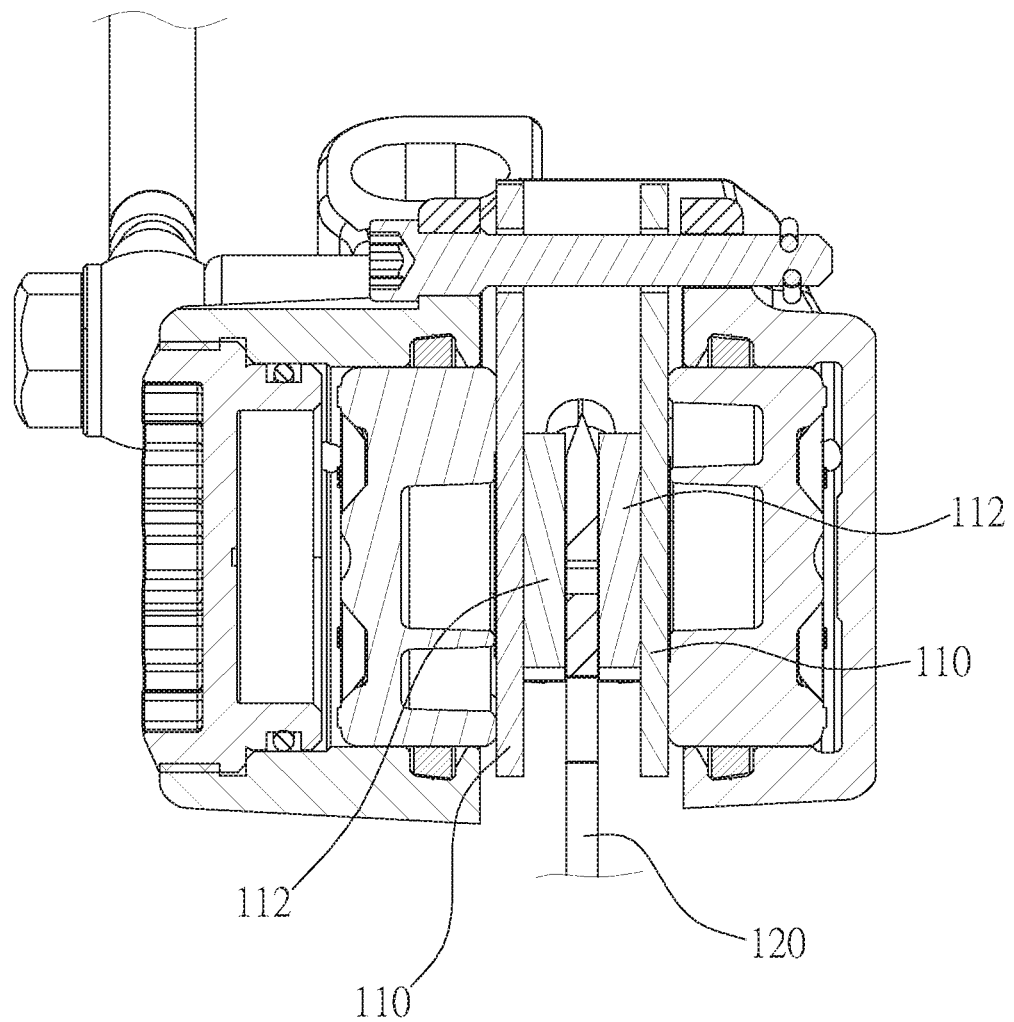
FIG. 1 is a sectional view, showing the structure of a conventional disc brake device.
Figure 2:
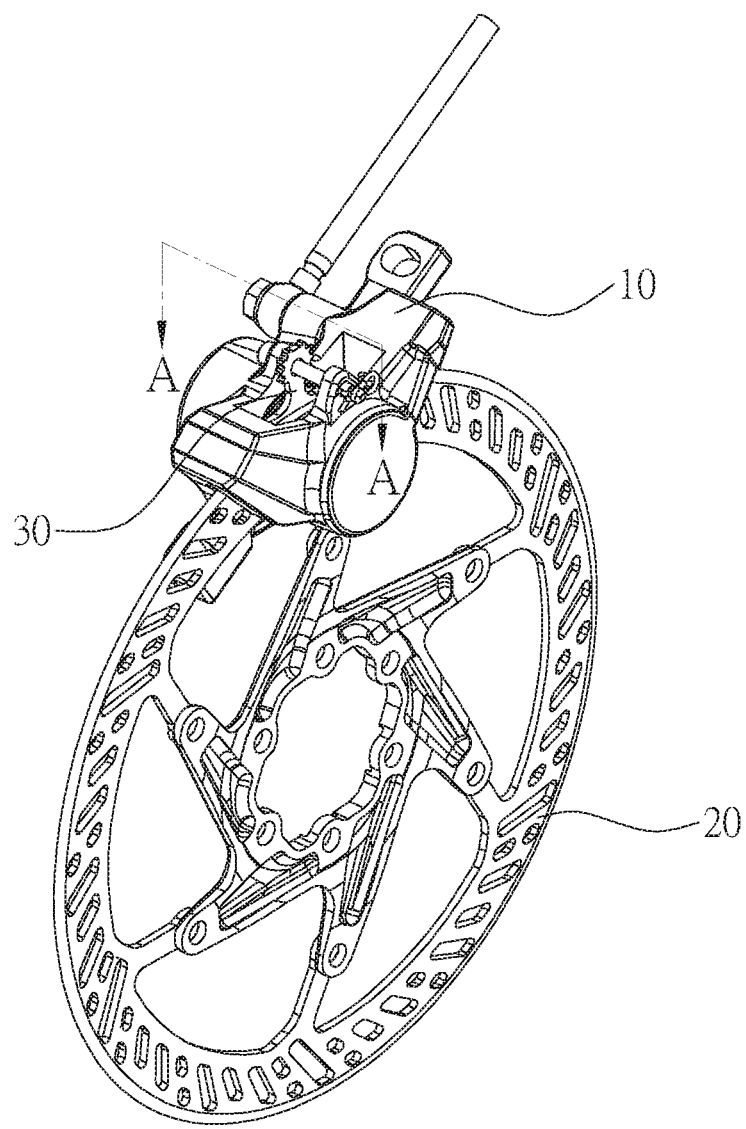
FIG. 2 is a perspective view of the disc brake device of a first preferred embodiment of the present disclosure.
Figure 3:
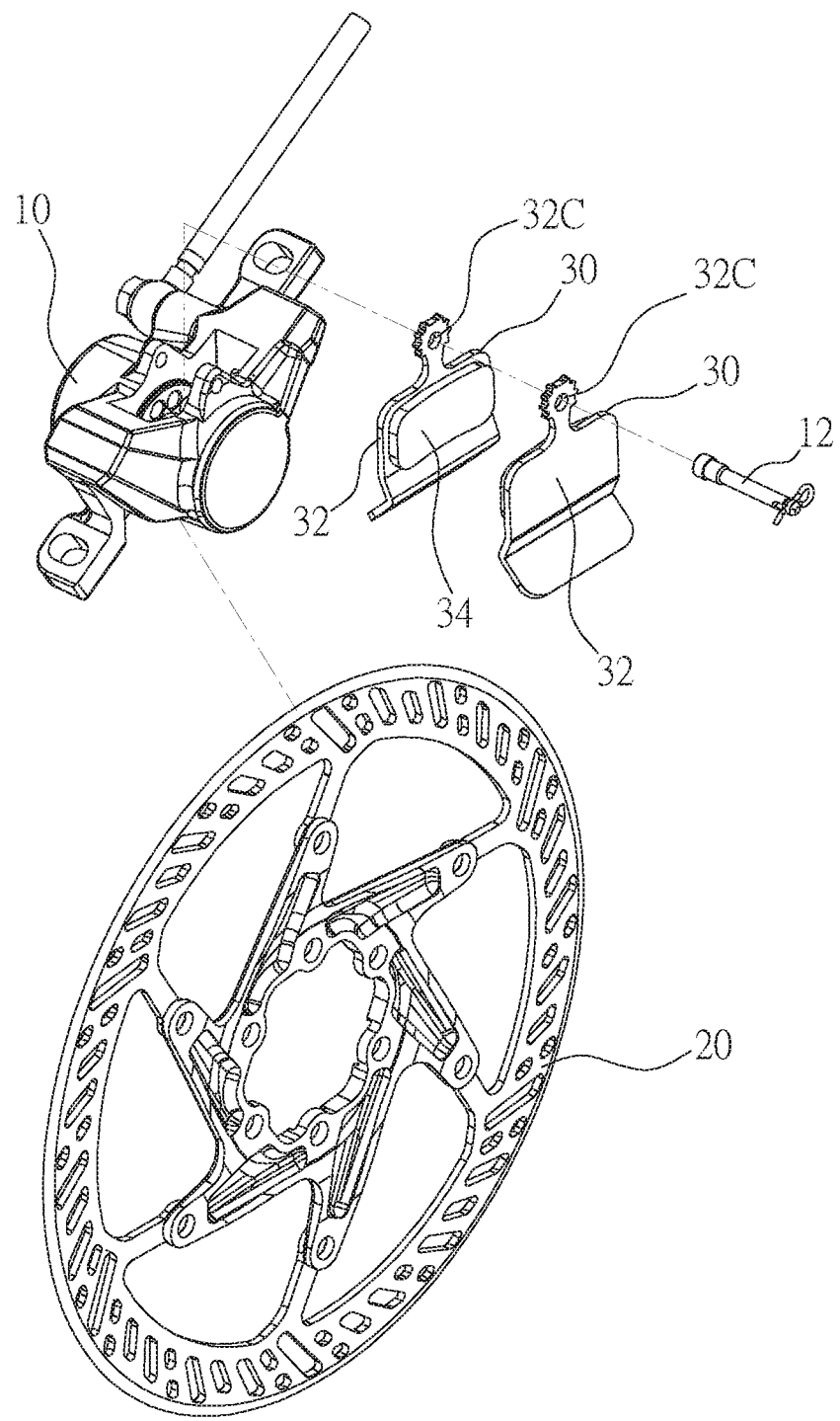
FIG. 3 is an exploded view of the disc brake device of the first preferred embodiment of the present disclosure.
Figure 4:
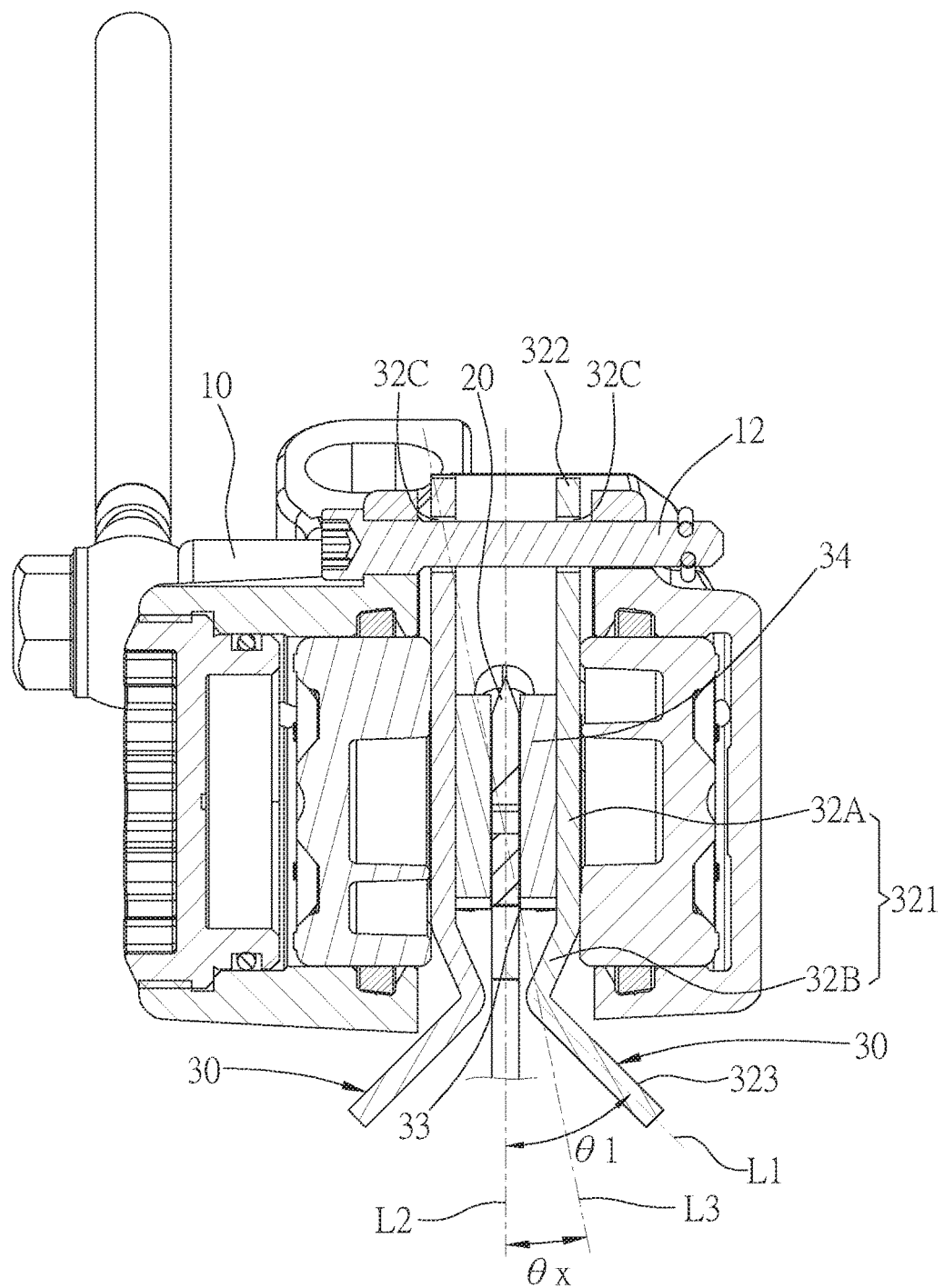
FIG. 4 is a sectional view along the A-A line in FIG. 2.

As shown in FIG. 2 to FIG. 4, a disc brake device of the first preferred embodiment of the present disclosure includes a caliper 10, a disc 20, and two brake linings 30, wherein a part of the disc 20 is located in the caliper 10, and is rotatable relative to the caliper 10. Also, since the structures of the caliper 10 and the disc 20 are conventional and not key features of the present disclosure, we are not going to describe the detailed structures of the caliper 10 and the disc 20 herein.

Figure 5:
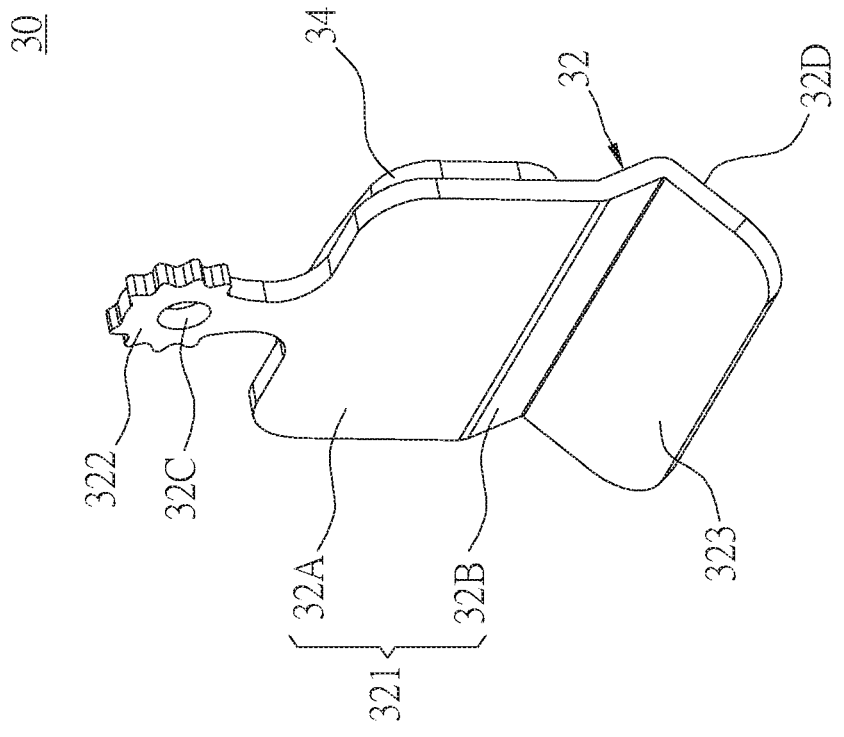
FIG. 5 is a perspective view of the brake lining of the first preferred embodiment of the present disclosure.

The brake linings 30 are disposed in the caliper 10 with the disc 20 located therebetween, and can be driven by the caliper 10 to move toward each other. In this way, the brake linings 30 can be pressed against the disc 20 to restrict the disc 20 from rotating, and consequently to brake the bicycle. As further illustrated in FIG. 5 and FIG. 6, each of the brake linings 30 includes a carrier 32 and a friction block 34, wherein the carrier 32 has a bearing portion 321, a fixing portion 322, and a guide portion 323. In the first preferred embodiment, each of the bearing portions 321 has a first segment 32A and a second segment 32B, wherein the second segment 32B is connected to an end of the first segment 32A, and extends toward the location of the disc 20. For each of the brake linings 30, the fixing portion 322 is connected to another end of the first segment 32A, while the guide portion 323 is connected to the second segment 32B of the bearing portion 321. The fixing portion 322 has a perforation 32C near a free end thereof. Furthermore, it is clearly depicted in FIG. 3 and FIG. 4 that, when the brake linings 30 are disposed in the caliper 10, the perforations 32C are adapted to be inserted by a pin 12, which defines a moving path of the brake linings 30. Each of the guide portions 323 has a guide surface 32D, which is flat and located on the side where the disc 20 is. Also, each of the friction blocks 34 has an attaching portion 341 and an abutting portion 342 located on an opposite side of the attaching portion 341, wherein the attaching portion 341 is connected to the first segment 32A of the bearing portion 321 on a surface thereof which faces the disc 20, so that the friction block 34 is disposed on the first segment 32A of the bearing portion 321 for each of the brake linings 30.

Figure 6:
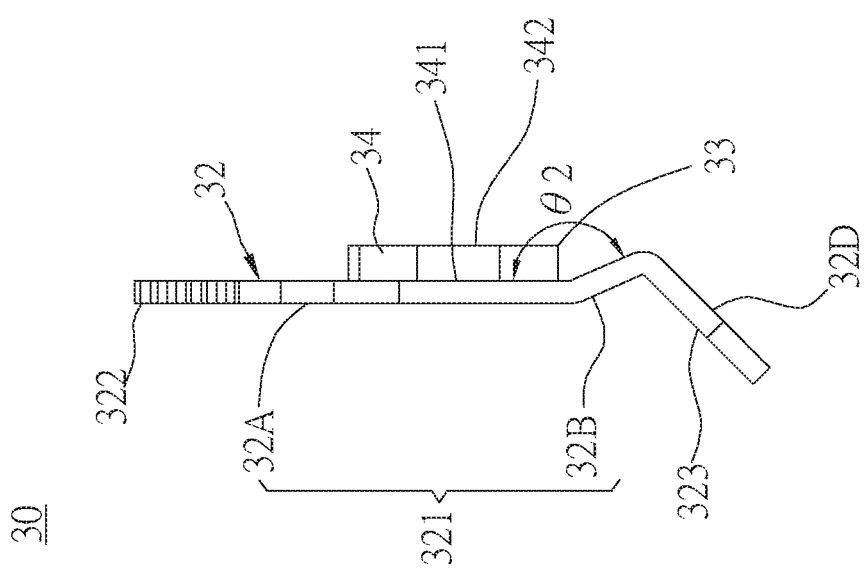
FIG. 6 is a side view of the brake lining of the first preferred embodiment of the present disclosure.

As shown in FIG. 4 and FIG. 6, each of the carriers 32 of the first preferred embodiment satisfies the following conditions in structure:

1. A first virtual line L1, a second virtual line L2, and a third virtual line L3 are depicted in FIG. 4, wherein, take one of the brake linings 30 for an explanation, the first virtual line L1 passes through the free end of the guide portion 323 and a junction between the guide portion 323 and the bearing portion 321, the second virtual line L2 passes two opposite points of the disc periphery 20, and the third virtual line L3 passes through an end corner 33 of the friction block 34, which is the closest to the guide portion 323, and the junction between the guide portion 323 and the bearing portion 321. The first virtual line L1 and the second virtual line L2 has a first included angle $\theta 1$ formed therebetween, which is greater than 0 degrees. More specifically, a maximum allowed degree for the first included angle $\theta 1$ is preferred to be 45 degrees. On the other hand, a second included angle $\theta x$ is formed between the second virtual line L2 and the third virtual line L3, wherein the first included angle $\theta 1$ is greater than or equal to the second included angle $\theta x$ in all embodiments. In other words, the smallest possible degree for the included angle $\theta 1$ in all embodiments is equal to the second included angle $\theta x$.

2. As shown in FIG. 6, an included angle $\theta 2$ is formed between the first segment 32A and the second segment 32B for each of the brake linings 30, wherein the included angle $\theta 2$ is less than 180 degrees. More specifically, the included angle $\theta 2$ is preferred to be less than 170 degrees.

Figure 7:
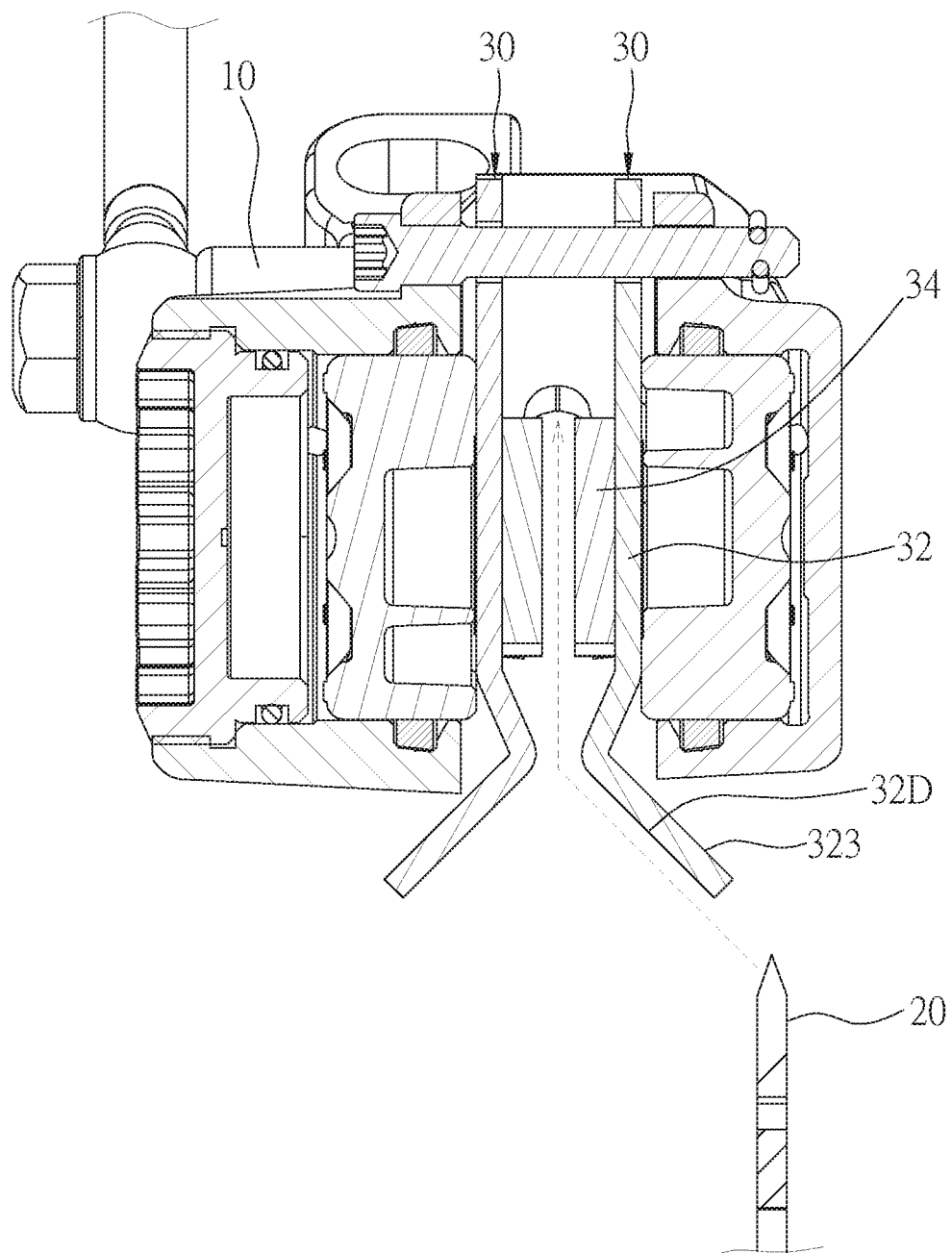
FIG. 7 is a schematic view showing the process of installing the disc with the first preferred embodiment of the present disclosure.

As illustrated in FIG. 7, if the carrier 32 of each of the brake linings 30 satisfies the aforementioned condition 1, while installing the disc 20, the disc 20 can be smoothly moved to the space between the brake linings 30 along with the shape of the guide surface 32D of the relevant guide portion 323 without being hindered by or colliding with the friction blocks 34 of the brake linings 30, whereby the difficulty and time required for installing or fixing a disc brake device could be reduced. Also, the reason for restricting the first included angle $\theta 1$ to be less than 45 degrees is that, if the first included angle $\theta 1$ is greater than 45 degrees, the relevant guide portion 323 would be over bent, and, therefore, would not be able to guide the disc 20 appropriately; the disc 20 could even be hindered by the guide portion 323. In other words, if the first included angle $\theta 1$ is less than 45 degrees, it could ensure that the guide surface 32D of the guide portion 323 could provide a better guiding effect. Also, since the disc 20 would not collide with the friction blocks 34 during installation, the disc 20 and the brake linings 30 could be ensured intact.

Furthermore, if the carrier 32 of each of the brake linings 30 satisfies the aforementioned condition 2, it would be not necessary to have a very long guide portion 323 to guide the disc 20 to avoid colliding with the friction blocks 34. Therefore, a length of the guide portion 323 could be effectively shortened if the included angle θ2 is less than 170 degrees, whereby the size and weight of the whole device can be reduced. More specifically, the caliper 10 used for installing the brake linings 30 should be able to keep the brake linings 30 within a projection area thereof without the need of being too big, which ensures the brake linings 30 would not interfere other components after being installed. In other words, if the carrier 32 of each of the brake linings 30 satisfies the aforementioned condition 2, the brake linings 30 would be compatible with quite a several kinds of calipers available in the market, regardless of the different thicknesses or sizes the calipers might have, which enhances the compatibility of such a brake lining 30. Of course, it is worth mentioning that, in other feasible embodiments, if the surrounding space of the caliper is large enough to further extend the guide portion 323, the objective of guiding the disc 20 to avoid colliding with the friction blocks 34 can be still achieved even if the first segment 32A and the second segment 32B of the bearing portion constitute one single plane and have no included angle formed therebetween.

With the design of the aforementioned brake linings 30, while assembling the disc 20, the guide portion 323 of each of the brake linings 30 could effectively guide the disc 20 and smoothly move it to the space between the brake linings 30 without colliding with or being hindered by the friction blocks 34, and, therefore, the difficulty and time required for installing or fixing a disc brake device could be reduced.

Also, with the design of the aforementioned brake linings 30, the disc 20 would not collide with the friction blocks 34 during installation, so that the safety and performance of the disc brake device could be ensured once the installation is completed.

Figure 8:
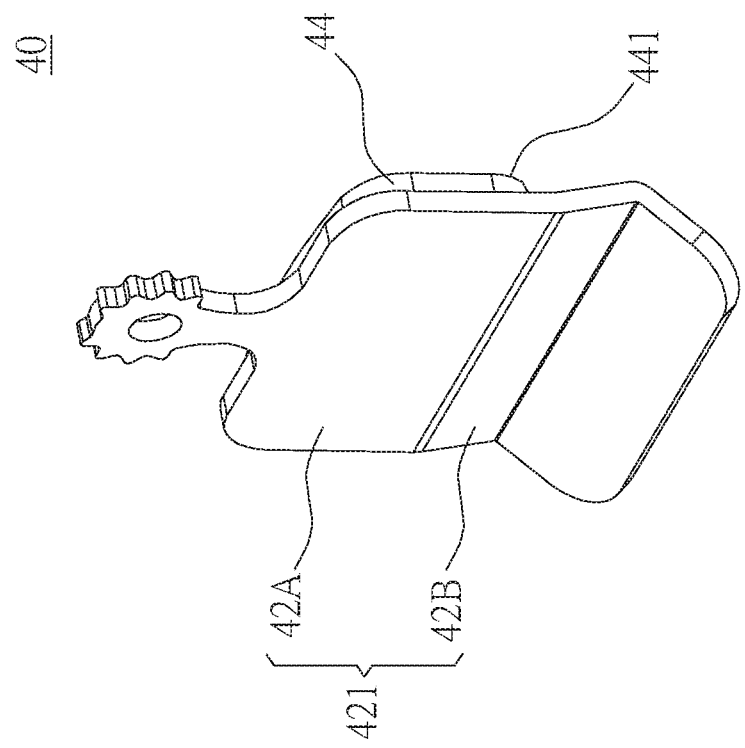
FIG. 8 is a perspective view of the brake lining of a second preferred embodiment of the present disclosure.
Figure 9:
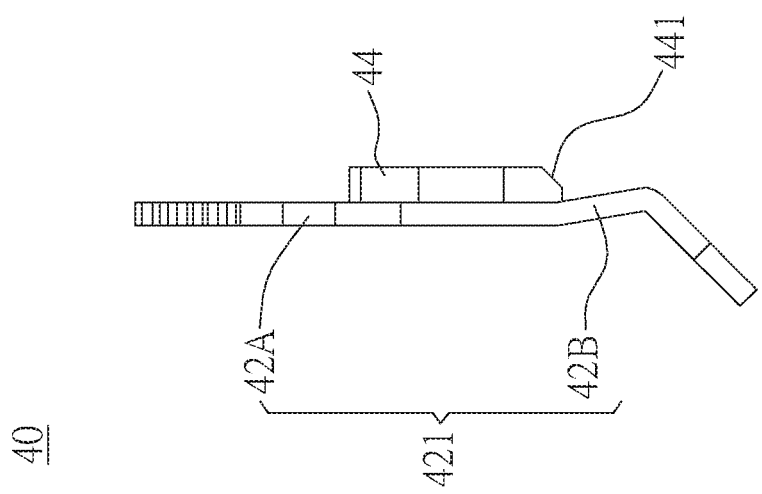
FIG. 9 is a side view of the brake lining of the second preferred embodiment of the present disclosure.

In addition to the aforementioned structural designs, other feasible structures of the brake lining are explained below:

A brake lining 40 of a second preferred embodiment of the present disclosure is shown in FIG. 8 and FIG. 9. The difference between the brake lining 40 of the second preferred embodiment and the brake lining 30 of the first preferred embodiment is that, an included angle formed between a first segment 42A and a second segment 42B of a bearing portion 421 is greater than that of the first preferred embodiment (but it's still less than 180 degrees), and an inclined surface 441 is further provided at an edge of an abutting portion of a friction block 44 near a guide portion. With the inclined surface 441, the disc 20 could be further guaranteed not to collide with nor being hindered by the friction block 44 during installation, whereby the effect of the previous preferred embodiment could be achieved as well.

Figure 10:
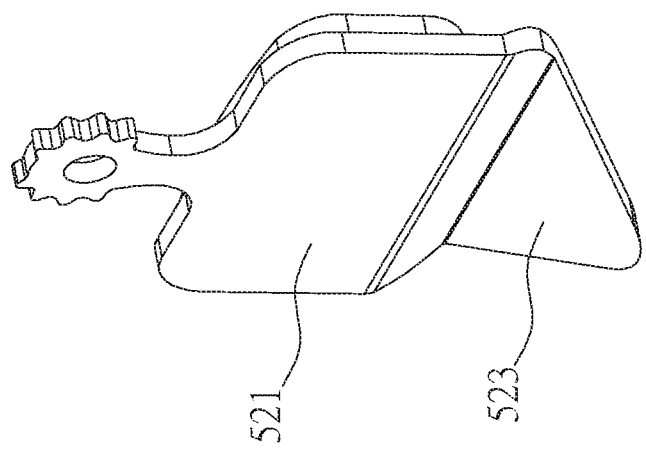
FIG. 10 is a perspective view of the brake lining of a third preferred embodiment of the present disclosure.
Figure 11:
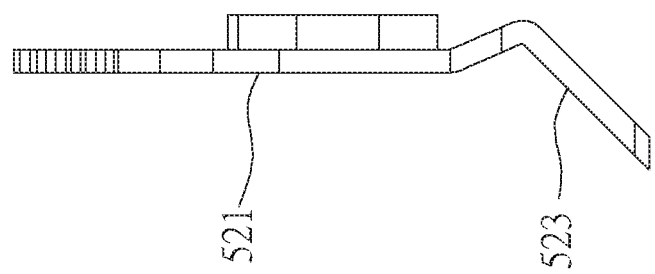
FIG. 11 is a side view of the brake lining of the third preferred embodiment of the present disclosure.

A brake lining 50 of a third preferred embodiment of the present disclosure is shown in FIG. 10 and FIG. 11. The difference between the brake lining 50 of the third preferred embodiment and the brake lining 30 of the first preferred embodiment is that, a width of a guide portion 523 gradually reduces from a junction between a guide portion 523 and a bearing portion 521 to a free end of the guide portion 523. With such design, the weight of the brake lining 50 could be effectively lowered, leading to more efficient power transmission when the caliper 10 is driving the brake lining 50. Furthermore, the guide portion 523 could also provide the effect of the embodiments above.

Figure 12:
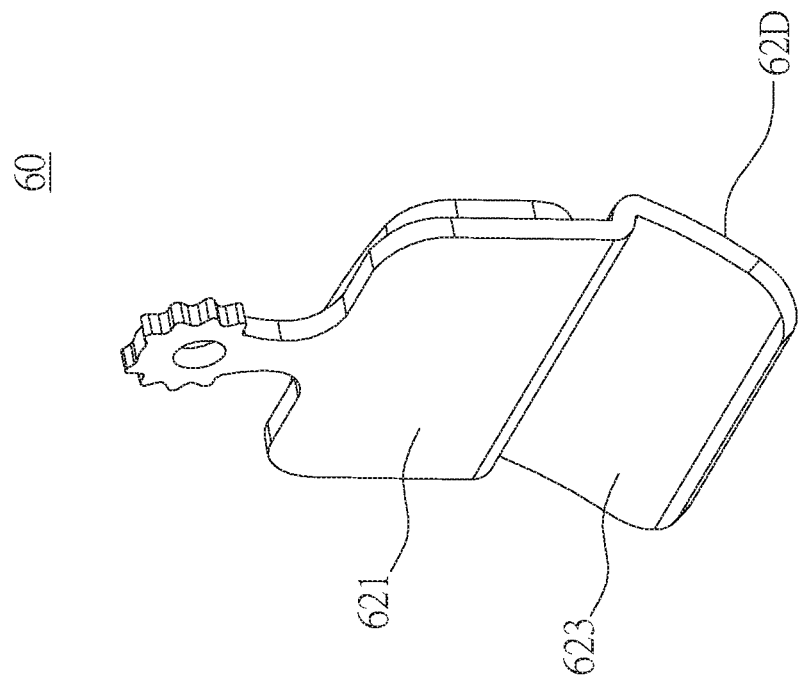
FIG. 12 is a perspective view of the brake lining of a fourth preferred embodiment of the present disclosure.
Figure 13:
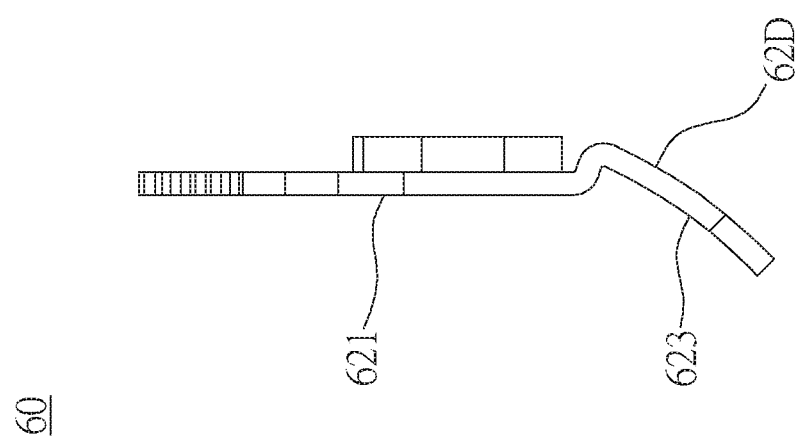
FIG. 13 is a side view of the brake lining of the fourth preferred embodiment of the present disclosure.

A brake lining 60 of a fourth preferred embodiment of the present disclosure is shown in FIG. 12 and FIG. 13. The difference between the brake lining 60 of the fourth preferred embodiment and the brake lining 30 of the first preferred embodiment is that, in addition that a guide portion 623 is bent outwardly, a guide surface 62D of the guide portion 623 is also not flat, but is curved from a junction between the guide portion 623 and a bearing portion 621 to a free end of the guide portion 623. With the curved guide surface 62D, the disc 20 could be moved into the space between two brake linings 60 along with the guide surface 62D of the guide portion 623 even more smoothly, which further reduces the difficulty and time required for installing or fixing a disc brake device.

Figure 14:
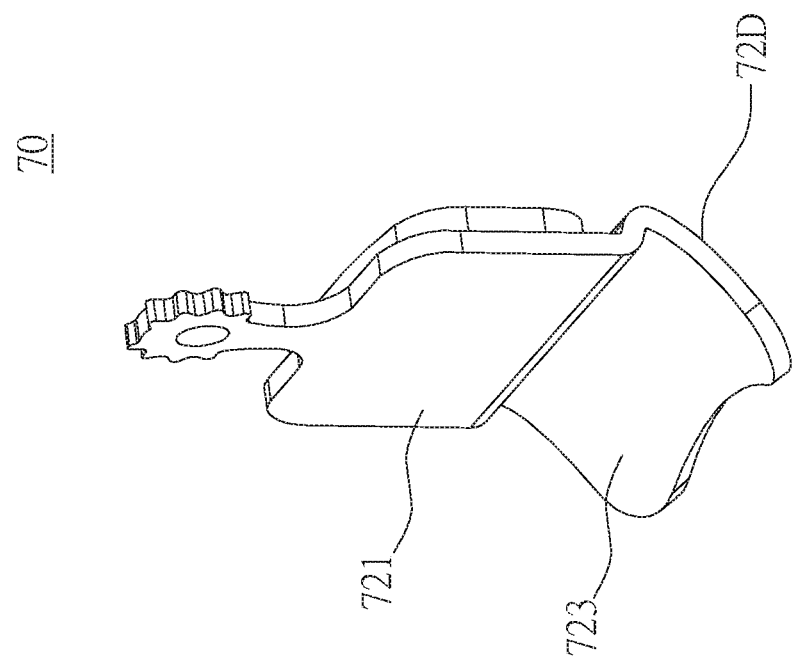
FIG. 14 is a perspective view of the brake lining of a fifth preferred embodiment of the present disclosure.
Figure 15:
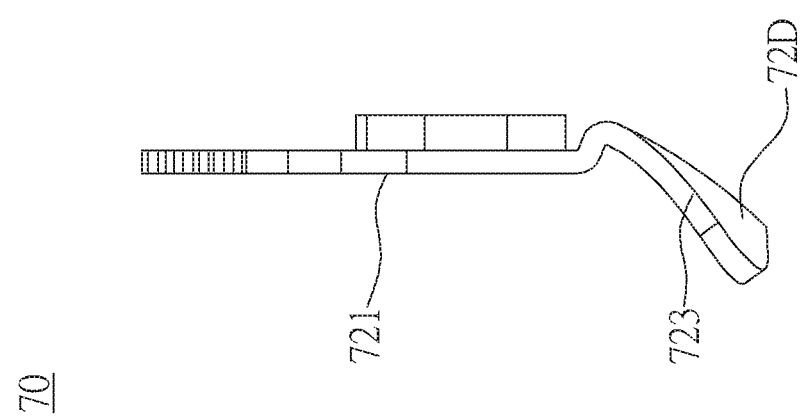
FIG. 15 is a side view of the brake lining of the fifth preferred embodiment of the present disclosure.

A brake lining 70 of a fifth preferred embodiment of the present disclosure is shown in FIG. 14 and FIG. 15. The difference between the brake lining 70 of the fifth preferred embodiment and the brake lining 30 of the first preferred embodiment is that, in addition that a guide portion 723 is bent outwardly, a guide surface 72D of the guide portion 723 is also not flat, but is curved from a junction between the guide portion 723 and a bearing portion 721 to a free end of the guide portion 723, wherein a lateral edge of the guide portion 723 is curved toward an opposite lateral edge thereof to form a double curve. With the guide surface 72D designed to have a double curve, the disc 20 could be moved into the space between two brake linings 70 along with the guide surface 72D even more smoothly, and furthermore, such design would allow the disc 20 to be installed with different installation angles which are not workable with conventional structures. Whereby, the difficulty and time required for installing or fixing a disc brake device would be effectively reduced.

Figure 16:
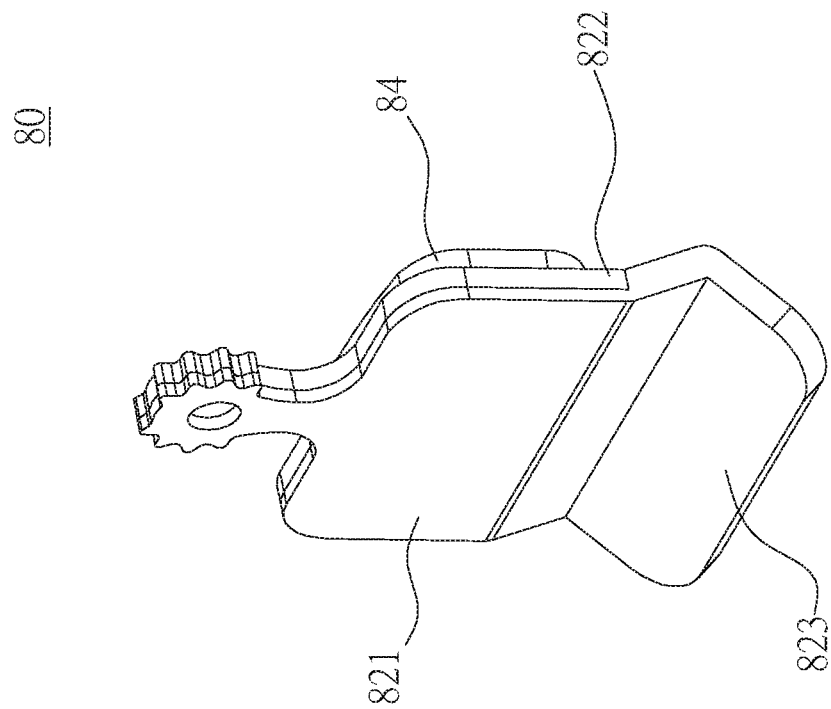
FIG. 16 is a perspective view of the brake lining of a sixth preferred embodiment of the present disclosure.
Figure 17:
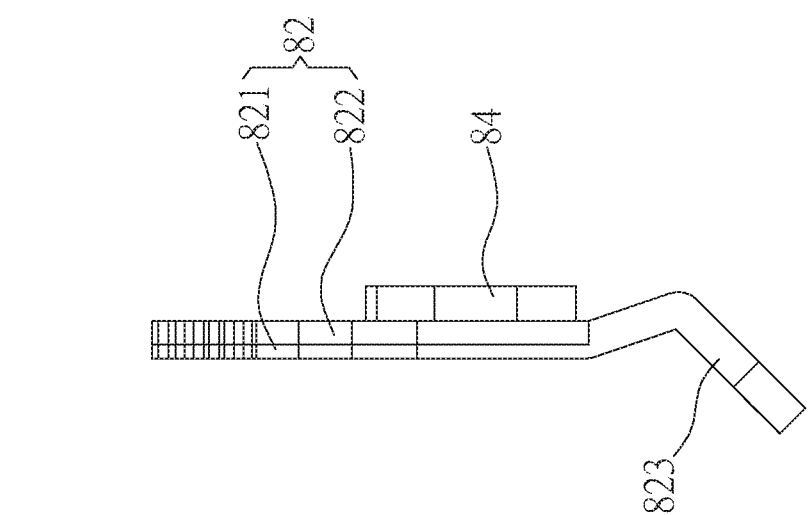
FIG. 17 is a side view of the brake lining of the sixth preferred embodiment of the present disclosure.

A brake lining 80 of a sixth preferred embodiment of the present disclosure is shown in FIG. 16 and FIG. 17. The difference between the brake lining 80 of the sixth preferred embodiment and the brake lining 30 of the first preferred embodiment is that, the brake lining 80 is not integrally made, but includes two components. More specifically, the carrier 82 includes a first substrate 821 and a second substrate 822, wherein the first substrate 821 has a guide portion 823, while a friction block 84 is provided on the second substrate 822. The second substrate 822 is connected to the first substrate 821 to form a structure with the same function of the bearing portion and the fixing portion of the aforementioned embodiments. Since the brake lining 80 includes two components, the first substrate 821 and the second substrate 822 could be made of different materials. For example, the second substrate 822 could be made of materials of high intensity to withstand the stress generated when the friction blocks 84 of two brake linings 80 are pressed against a disc, while the first substrate 821 could be made of lighter materials. In this way, the resultant disc brake device would have sufficient mechanical strength yet still light weighted. Furthermore, if the friction block 84 is worn after being used for a period, and needs to be replaced, a user could simply replace the second substrate 822 which has the friction block 84 provided thereon, and the first substrate 821 could remain unchanged if it's still usable, which would benefit environmental protection. The guide portion 823 on the first substrate 821 could still avoid the disc 20 from colliding with or being hindered by the friction block 84 during installation, and therefore, the effect of the embodiments above could be achieved.

Also, it must be noted that, take the first preferred embodiment as an example, while using a disc brake device, it is not always necessary to have two brake linings 30; only one brake lining 30 with another conventional lining would still work. More specifically, no matter the number of the brake lining 30 is only one or two, as long as there is one brake lining 30 being installed on an installation track of the disc 20, it would be able to guide the disc 20 to avoid colliding with or being hindered by the friction blocks 34. It must be pointed out that the embodiments described above are only some preferred embodiments of the present disclosure. All equivalent structures which employ the concepts disclosed in this specification and the appended claims should fall within the scope of the present disclosure.

What is claimed is:

1. A brake lining of a disc brake device, wherein the disc brake device usually has two said brake linings with a disc disposed therebetween, or has one said brake lining and another conventional lining with the disc disposed therebetween; either two said brake linings or one said brake lining with the another conventional lining are drivable to be pressed against the disc to restrict the disc from rotating; the brake lining comprising:
  a carrier having a bearing portion and a guide portion connected to an end of the bearing portion, wherein the bearing portion has a first segment and a second segment connected to the first segment; an included angle formed between the first segment and the second segment is less than 180 degrees; the guide portion is connected to the second segment; a first virtual line passes through a free end of the guide portion and a junction between the guide portion and the bearing portion, and a second virtual line passes through two opposite points of the disc periphery; a first included angle formed between the first virtual line and the second virtual line is greater than 0 degrees; and
  a friction block provided on the bearing portion, wherein the friction block is provided on the first segment of the bearing portion;
  wherein, a third virtual line passes through an end corner of the friction block and the junction between the guide portion and the bearing portion, and the first included angle is greater than or equal to a second included angle formed between the second virtual line and the third virtual line.

2. The brake lining of claim 1, wherein the included angle between the first segment and the second segment is less than 170 degrees.

3. The brake lining of claim 1, wherein the first included angle between the first virtual line and the second virtual line is less than 45 degrees.

4. The brake lining of claim 1, wherein the friction block has an attaching portion and an abutting portion located on an opposite side of the attaching portion; the attaching portion is connected to the bearing portion; the end corner which the third virtual line passes through is on the abutting portion.

5. The brake lining of claim 1, wherein the guide portion has a guide surface provided on a side the disc is located, and the guide surface is flat.

6. The brake lining of claim 1, wherein the guide portion has a guide surface provided on a side the disc is located, and the guide surface is curved from the junction between the guide portion and the bearing portion toward the free end of the guide portion.

7. The brake lining of claim 1, wherein the guide portion has a guide surface provided on a side the disc is located, and the guide surface is curved from the junction between the guide portion and the bearing portion toward the free end of the guide portion; a lateral edge of the guide portion is curved toward an opposite lateral edge thereof to form a double curve.

8. The brake lining of claim 1, wherein a width of the guide portion gradually reduces from the junction between the guide portion and the bearing portion to the free end of the guide portion.

9. The brake lining of claim 1, wherein the carrier includes a first substrate and a second substrate; the first substrate has the guide portion provided thereon; the second substrate is connected to the first substrate to form the bearing portion, and the friction block is provided on the second substrate.

10. The brake lining of claim 1, wherein the friction block has an attaching portion and an abutting portion located on an opposite side of the attaching portion; the attaching portion is connected to the bearing portion, and the friction block has an inclined surface at an edge of the abutting portion near the guide portion.

11. A brake lining of a disc brake device, wherein the disc brake device usually has two said brake linings with a disc disposed therebetween, or has one said brake lining and another conventional lining with the disc disposed therebetween; either two said brake linings or one said brake lining with the another conventional lining are drivable to be pressed against the disc to restrict the disc from rotating; the brake lining comprising:
  a carrier having a bearing portion and a guide portion, wherein the bearing portion has a first segment and a second segment connected to the first segment; an included angle formed between the first segment and the second segment is less than 180 degrees; the guide portion is connected to the second segment; a first virtual line passes through a free end of the guide portion and a junction between the guide portion and the bearing portion, and a second virtual line passes through two opposite points of the disc periphery; a first included angle formed between the first virtual line and the second virtual line is greater than 0 degrees; and
  a friction block provided on the first segment of the bearing portion.

12. The brake lining of claim 11, wherein the included angle between the first segment and the second segment is less than 170 degrees.

13. The brake lining of claim 11, wherein the first included angle between the first virtual line and the second virtual line is less than 45 degrees.

14. The brake lining of claim 11, wherein the guide portion has a guide surface provided on a side the disc is located, and the guide surface is flat.

15. The brake lining of claim 11, wherein the guide portion has a guide surface provided on a side the disc is located, and the guide surface is curved from the junction between the guide portion and the bearing portion toward the free end of the guide portion.

16. The brake lining of claim 11, wherein the guide portion has a guide surface provided on a side the disc is located, and the guide surface is curved from the junction between the guide portion and the bearing portion toward the free end of the guide portion; a lateral edge of the guide portion is curved toward an opposite lateral edge thereof to form a double curve.

17. The brake lining of claim 11, wherein a width of the guide portion gradually reduces from the junction between the guide portion and the bearing portion to the free end of the guide portion.

18. The brake lining of claim 11, wherein the carrier includes a first substrate and a second substrate; the first substrate has the guide portion provided thereon; the second substrate is connected to the first substrate to form the bearing portion, and the friction block is provided on the second substrate.

19. The brake lining of claim 11, wherein the friction block has an attaching portion and an abutting portion located on an opposite side of the attaching portion; the attaching portion is connected to the first segment of the bearing portion, and the friction block has an inclined surface at an edge of the abutting portion near the guide portion.

* * * * *